(12) United States Patent
Yamada et al.

(10) Patent No.: US 8,755,132 B2
(45) Date of Patent: Jun. 17, 2014

(54) WIDE ANGLE OPTICAL SYSTEM AND IMAGE PICKUP APPARATUS USING THE SAME

(75) Inventors: Yasuharu Yamada, Hachioji (JP); Hirohiko Kimata, Hino (JP)

(73) Assignee: Olympus Imaging Corp., Tokyo (JP)

( * ) Notice: Subject to any disclaimer, the term of this patent is extended or adjusted under 35 U.S.C. 154(b) by 1182 days.

(21) Appl. No.: 12/657,537

(22) Filed: Jan. 23, 2010

(65) Prior Publication Data

US 2010/0201782 A1    Aug. 12, 2010

(30) Foreign Application Priority Data

Feb. 12, 2009    (JP) .................................. 2009-029563

(51) Int. Cl.
*G02B 9/00*  (2006.01)
*G02B 13/00*  (2006.01)

(52) U.S. Cl.
CPC ....................................... *G02B 13/00* (2013.01)
USPC .......................................................... 359/740

(58) Field of Classification Search
USPC ........................................ 359/749, 750–753
See application file for complete search history.

(56) References Cited

U.S. PATENT DOCUMENTS

| | | | | |
|---|---|---|---|---|
| 6,710,942 B2 * | 3/2004 | Sato | ............................... | 359/749 |
| 7,184,219 B2 * | 2/2007 | Kobayashi | .................... | 359/651 |
| 7,277,232 B2 * | 10/2007 | Sato | ............................... | 359/682 |
| 8,000,035 B2 * | 8/2011 | Harada | ......................... | 359/749 |

FOREIGN PATENT DOCUMENTS

| | | |
|---|---|---|
| JP | 09-166748 | 6/1997 |
| JP | 11-142730 | 5/1999 |
| JP | 11-242155 | 9/1999 |
| JP | 11-249009 | 9/1999 |
| JP | 2000-235145 | 8/2000 |

* cited by examiner

*Primary Examiner* — Ricky Mack
*Assistant Examiner* — Robert E Tallman
(74) *Attorney, Agent, or Firm* — Kenyon & Kenyon LLP

(57) ABSTRACT

A wide angle optical system including a first lens group of negative refractive power and a second lens group of positive refractive power arranged in the above-mentioned order from the object side. The second lens group includes a cemented doublet SU21; an aperture diaphragm; a lens SU22; and a biconvex lens L25 arranged in the above-mentioned order from the object side, and largest ones of air spaces on the axis being front and rear spaces of the aperture diaphragm except the back focal length. The wide angle optical system is divided into the first lens group and the second lens group at the second largest air space operating as a boundary.

26 Claims, 8 Drawing Sheets

Example 1

Example 2

Example 3

Example 4

WIDE ANGLE OPTICAL SYSTEM AND IMAGE PICKUP APPARATUS USING THE SAME

CROSS REFERENCE TO RELATED APPLICATION

This application claims the benefit of Japanese Patent Application No. 2009-029563 filed in Japan on Feb. 12, 2009, the contents of which are incorporated herein by reference.

BACKGROUND OF THE INVENTION

1. Field of the Invention

The present invention relates to an optical system that is used in an image pickup apparatus or the like. More particularly, the present invention relates to a wide angle optical system that is used in a digital single lens camera or a compact camera and also to an image pickup apparatus using the same.

2. Description of the Related Art

Wide angle lenses of digital cameras require an optical system having a long back focal length because they need a space for receiving optical elements including a filter immediately in front of the electronic imaging plane, while securing a wide angle of view. Retrofocus type optical systems having a front lens group of negative refractive power and a back lens group of positive refractive power are being popularly employed for wide angle lenses.

When an incident flux of light that strikes the electronic imaging plane of a wide angle lens obliquely relative to the optical axis after being transmitted through the optical system to give rise to an obliquely incident state, the peripheral quantity of light is reduced to produce shading and color misregistration. Therefore, optical systems keeping telecentricity for the incident flux of light have been proposed. Techniques of this type include those disclosed in Patent Document 1 (JP-A-2000-235145), Patent Document 2 (JP-A-11-249009), Patent Document 3 (JP-A-11-142730), Patent Document 4 (JP-A-09-166748) and Patent Document 5 (JP-A-11-242155).

There has been in recent years and still is a demand for compact wide angle lenses having a reduced number of component lenses and a reduced total lens length to be used in digital cameras. It is difficult to design an optical system for a lens with a small number of component lenses, while securing a wide angle of view, suppressing various aberrations and maintaining the telecentricity at the same time. However, due to the technological development in recent years in the field of electronic image pickup elements, it is no longer necessary to strongly pay attention to correction of distortions as techniques have been proposed to correct distortions to a certain extent by means of electric signals.

In view of the above-described circumstances, it is therefore an object of the present invention to provide a compact wide angle optical system of an angle of view of about 60° that has a small number of component lenses and can correct various aberrations, such as chromatic aberration and field curvature in particular, while performing correction of distortions to a certain extent and secure telecentricity at the same time.

SUMMARY OF THE INVENTION

According to the present invention, the above object is achieved by providing a wide angle optical system including: a first lens group of negative refractive power; and a second lens group of positive refractive power; the first lens group and the second lens group being arranged in the above mentioned order from the object side; the second lens group including: a cemented doublet; an aperture diaphragm; a lens; and a biconvex lens; the cemented doublet, the aperture diaphragm, the lens and the biconvex lens being arranged in the above mentioned order from the object side; the largest ones of the air spaces on the axis being the front and rear spaces of the aperture diaphragm except the back focal length; the wide angle optical system being divided into the first lens group and the second lens group at the second largest air space operating as a boundary.

The reason why the above-described arrangement is selected will be described below.

The retrofocus type of arranging a negative lens group and a positive lens group respectively at the object side and at the image side is advantageous when the imaging angle of view is broad and the back focal length is large. Particularly, it is more advantageous when the space between the negative lens group and the positive lens group is broadened. The angle between the off axial main light beam can be reduced by the first lens group having negative refractive power. Additionally, the Petzval sum of the overall lens system is reduced and both the chromatic aberration and the field curvature are suppressed by the two set of cemented lenses arranged symmetrically relative to the aperture diaphragm of the second lens group disposed between them with large spaces and the exit pupil is moved away from the imaging plane by the biconvex lens at the extremity of the image side to realize a telecentric optical system and the influence of shading and other problems can be reduced by causing a light beam to enter the image pickup element substantially in parallel with the optical axis. With the above-described arrangement, the number of lenses is minimized to reduce the total lens length and establish a telecentric optical system with a wide angle of view while suppressing various aberrations.

A wide angle optical system according to the present invention preferably has any of the following additional arrangements.

Preferably, a wide angle optical system according to the present invention includes: a first lens group of negative refractive power; and a second lens group of positive refractive power; the first lens group and the second lens group being arranged in the above mentioned order from the object side; the second lens group including: a cemented doublet of a lens having a cemented convex surface and a lens having a cemented concave surface; an aperture diaphragm; a cemented doublet of a lens having a cemented concave surface and a lens having a cemented convex surface; and a biconvex lens; the cemented doublet, the aperture diaphragm, the cemented doublet and the biconvex lens being arranged in the above mentioned order from the object side.

As pointed out above, the retrofocus type of arranging a negative lens group and a positive lens group respectively at the object side and at the image side is advantageous when the imaging angle of view is broad and the back focal length is large. The symmetry of the overall lens system can be improved and the Petzval sum of the overall lens system is reduced while both the chromatic aberration and the field curvature are suppressed by the two set of cemented lenses arranged symmetrically relative to the aperture diaphragm of the second lens group. The exit pupil is moved away from the imaging plane by the biconvex lens at the extremity of the image side to realize a telecentric optical system and the influence of shading and other problems are reduced by causing a light beam to enter the image pickup element substantially in parallel with the optical axis.

Preferably, in a wide angle optical system according to the present invention as defined above, the first lens group is formed by a meniscus lens having negative refractive power with a convex surface directed to the object side and the second lens group is formed by sequentially arranging a cemented doublet having positive refractive power of a biconvex lens and a lens having a cemented concave surface, an aperture diaphragm, a cemented doublet of a biconcave lens and a biconvex lens and a biconvex lens in the above-mentioned order from the object side.

With the above-described arrangement, it is possible to realize a compact and high optical performance wide angle optical system with a small number of lenses for which various aberrations can be corrected easily.

Preferably, in a wide angle optical system according to the present invention as defined above, the cemented doublet of a biconcave lens and a biconvex lens arranged in the above-mentioned order from the object side in the second lens group has positive refractive power.

With the above-described arrangement, both of the two sets of cemented lenses have positive refractive power and the power arrangement is symmetric relative to the aperture diaphragm so that it is possible to realize a compact and high optical performance wide angle optical system with a small number of lenses for which various aberrations can be corrected easily.

Preferably, in a wide angle optical system according to the present invention as defined above, the surface of the biconvex lens arranged at the extremity of the image side is an aspheric surface whose positive refractive power decreases as a function of the distance from the optical axis.

When the surface of the biconvex lens arranged at the extremity of the image side is an aspheric surface whose positive refractive power decreases as a function of the distance from the optical axis, it is possible to correct the field curvature and the barrel-shaped distortion that can easily appear when a retrofocus type optical system is downsized and consequently realize a compact and high performance wide angle optical system.

Preferably, a wide angle optical system according to the present invention as defined above satisfies the requirements of conditional formula (1) shown below:

$$0.3 \leq (R45+R23)/(R45-R23) \leq 0.5 \quad (1),$$

where
R23 is a radius of curvature of the cemented surface of the cemented lens arranged at the object side of the aperture diaphragm; and
R45 is a radius of curvature of the cemented surface of the cemented lens arranged at the image side of the aperture diaphragm.

The conditional formula (1) specifies the shape factor of the cemented surfaces of the cemented lenses arranged respectively at the object side and at the image side of the aperture diaphragm. The cemented surface of the object side cemented lens and the cemented surface of the image side cemented lens are arranged substantially symmetrically relative to the aperture diaphragm disposed between them so as to make then well-balanced and suppress the field curvature of the overall optical system.

When the upper limit of the conditional formula (1) is exceeded, a large field curvature takes place at the negative side to make any correction difficult. Conversely, when the lower limit of the conditional formula (1) is exceeded, a large field curvature takes place at the positive side to make any correction difficult.

Preferably, a wide angle optical system according to the present invention as defined above satisfies the requirements of conditional formula (2) shown below:

$$-0.5 \leq (R6r+R6f)/(R6r-R6f) \leq 0.3 \quad (2),$$

where
R6f is a radius of curvature of the object side lens surface of the biconvex lens at the extremity of the image side; and
R6r is a radius of curvature of the image side lens surface of the biconvex lens at the extremity of the image side.

The conditional formula (2) specifies the shape factor of the biconvex lens. When the upper limit of the conditional formula (2) is exceeded, a large spherical aberration takes place at the positive side to make any correction difficult. Conversely, when the lower limit of the conditional formula (2) is exceeded, a large spherical aberration takes place at the negative side to make any correction difficult.

Preferably, a wide angle optical system according to the present invention as defined above satisfies the requirements of conditional formula (3) shown below:

$$0.3 \leq (R3r+R3f)/(R3r-R3f) \leq 0.5 \quad (3),$$

where
R3f is a radius of curvature of the object side lens surface of the lens having a cemented concave surface of the cemented lens arranged at the object side of the aperture diaphragm; and
R3r is a radius of curvature of the image side lens surface of the lens having a cemented concave surface of the cemented lens arranged at the object side of the aperture diaphragm.

The conditional formula (3) specifies the shape factor of the lens having the cemented concave surface. When the upper limit of the conditional formula (3) is exceeded, a large field curvature takes place at the negative side to make any correction difficult. Conversely, when the lower limit of the conditional formula (3) is exceeded, a large field curvature takes place at the positive side to make any correction difficult.

Preferably, a wide angle optical system according to the present invention as defined above satisfies the requirements of conditional formula (4) shown below:

$$10 \leq (R45r+R45f)/(R45r-R45f) \leq 40 \quad (4),$$

where
R45f is a radius of curvature of the object side lens surface of the cemented lens arranged at the image side of the aperture diaphragm; and
R45r is a radius of curvature of the image side lens surface of the cemented lens arranged at the image side of the aperture diaphragm.

The conditional formula (4) specifies the shape factor of the cemented lens arranged at the image side of the aperture diaphragm. When the upper limit of the conditional formula (4) is exceeded, a large field curvature takes place at the positive side to make any correction difficult. Conversely, when the lower limit of the conditional formula (4) is exceeded, a large field curvature as well as large distortion takes place at the negative side to make any correction difficult.

Preferably, a wide angle optical system according to the present invention as defined above satisfies all the requirements of conditional formulas (5) and (6) shown below:

$$0.8 \leq f2/f \leq 1.2 \quad (5) \text{ and}$$

$$1.3 \leq |f1/f2| \leq 1.5 \quad (6),$$

where
- f1 is the focal length of the first lens group of the optical system;
- f2 is the focal length of the second lens group of the optical system; and
- f is the focal length of the overall optical system.

The conditional formula (5) specifies the refractive power of the second lens group. When the upper limit of the conditional formula (5) is exceeded, the refractive power of the second lens group is weakened to make corrections of various aberrations easy but such a weakened refractive power is not desirable in actual applications because the back focal length becomes long to by turn make the overall optical system large. Conversely, when the lower limit of the conditional formula (5) is exceeded, the refractive power of the second lens group becomes strong to make corrections of various aberrations difficult.

The conditional formula (6) provides the requirements of the balance of refractive power between the first lens group and the second lens group. When the upper limit of the conditional formula (6) is exceeded, the negative refractive power of the first lens group is weakened relative to the positive refractive power of the second lens group to make corrections of various aberrations easy but such a weakened refractive power reduces the effect of the retrofocus type and makes it difficult to secure a sufficient back focal length. Conversely, when the lower limit of the conditional formula (6) is exceeded, the negative refractive power of the first lens group becomes strong relative to the positive refractive power of the second lens group to make corrections of various aberrations difficult with a single lens, or the smallest number of lenses.

Preferably, a wide angle optical system according to the present invention as defined above satisfies all the requirements of conditional formulas (5)' and (7) shown below:

$$1.0 \leq f2/f \leq 1.4 \qquad (5)' \text{ and}$$

$$1.3 \leq |HD12/f| \leq 1.8 \qquad (7),$$

where
- f2 is the focal length of the second lens group of the optical system;
- f is the focal length of the overall optical system; and
- HD12 is a gap between the image side principal plane of the first lens group and the object side principal plane of the second lens group of the optical system.

The conditional formula (5)' specifies the refractive power of the second lens group. When the upper limit of the conditional formula (5)' is exceeded, the refractive power of the second lens group is weakened to make corrections of various aberrations easy but such a weakened refractive power is not desirable in actual applications because the back focal length becomes long to by turn make the overall optical system large. Conversely, when the lower limit of the conditional formula (5)' is exceeded, the refractive power of the second lens group becomes strong to make corrections of various aberrations difficult.

The conditional formula (7) standardizes a gap between the image side principal plane of the first lens group and the object side principal plane of the second lens group in terms of the focal length of the overall optical system. When the upper limit of the conditional formula (7) is exceeded, the gap between the first lens group and the second lens group is broadened to enhance the effect of the retrofocus type and make it easy to secure a sufficient back focal length but the entire optical system becomes large. Conversely, when the lower limit of the conditional formula (7) is exceeded, the gap between the first lens group and the second lens group is narrowed to reduce the effect of the retrofocus type and make it difficult to secure a sufficient back focal length.

Preferably, a wide angle optical system according to the present invention as defined above satisfies the requirements of conditional formula (8) shown below:

$$|IH/EXP| \leq 0.35 \qquad (8),$$

where
- IH is the largest image height; and
- EXP is the distance on the optical axis from the image plane to the exit pupil (the direction from the object side toward the image side being the positive direction).

The conditional formula (8) specifies the ratio of the largest image height to the distance on the optical axis from the image plane to the exit pupil. When the requirement of the conditional formula (8) is not satisfied, the position of the exit pupil of the optical system cannot be moved away sufficiently from the image plane to make it difficult to secure a telecentric optical system so that the wide angle optical system becomes liable to be influenced by shading.

When a wide angle optical system of the present invention is applied to an image pickup apparatus including a drive means for driving the entire optical system to move in the direction of the optical axis and an image pickup element arranged near the focusing surface of the optical system, preferably the overall optical system can be driven to move toward the image pickup element side along the optical axis beyond the focused position of an object at infinity and is held stationary at the image pickup element side relative to the focused position of an object at infinity in a state of not operating to pick up an image.

A method of extending the entire optical system in the direction of the optical axis is adopted to adjust the focus of a wide angle optical system according to the present invention so that the total length of the optical system is extremely minimized in a state of operating to pick up an image and the focusing mechanism of extending the entire optical system is exploited in a state of not operating to pick up an image so as to move the entire optical system toward the image pickup element side beyond the focused position of an object at infinity in order to make it possible to further reduce the total length (a so-called state of retracted barrel).

When a wide angle optical system according to the present invention is applied to an image pickup apparatus, preferably a space is provided in advance between the lens at the extremity of the image side of the optical system and the image pickup element so as to allow the entire optical system to move toward the image pickup element side along the optical axis beyond the focused position of an object at infinity so that a limiting region is secured at the image pickup element side in a state where the entire lens barrel is retracted.

While a wide angle optical system according to the present invention can be downsized as a whole if it is designed to minimize the space at the image pickup element side, then the exit pupil is located too close to the image plane to make the influence of shading too large. Therefore, in an image pickup apparatus including an optical system according to the present invention, telecentricity is secured by sufficiently separating the exit pupil from the image plane in a state of operating to pick up an image and a space is provided in advance between the lens at the extremity of the image side of the optical system and the image pickup element so as to avoid interference with the low pass filter and other elements arranged in front of the image pickup element in a state of not operating to pick up an image even when the entire optical system is moved toward the image side. In this way, an image pickup apparatus according to the present invention can be downsized satisfactorily when not operating to pick up an image and perform optically excellently when operating to pick up an image.

Preferably, the requirements of the conditional formula (2) are modified as follows:

$$-0.3 \leq (R6r+R6f)/(R6r-R6f) \leq 0.2 \quad (2)'$$ or $$-0.1 \leq (R6r+R6f)/(R6r-R6f) \leq 0.1 \quad (2)''.$$

Incidentally, only the upper limit value of each of the above conditional formulas may be selected for the modified formula or only the lower limit value of each of the above conditional formulas may be selected for the modified formula.

Thus, as described above, the present invention can provide a compact wide angle optical system of an angle of view of about 60° that has a small number of component lenses and can correct various aberrations, such as chromatic aberrations and field curvatures in particular, while performing correction of distortions to a certain extent and secure telecentricity at the same time.

Still other objects and advantages of the invention will in part be obvious and will in part be apparent from the specification.

The invention accordingly includes the features of construction, combinations of elements and arrangement of parts which will be exemplified in the construction hereinafter set forth and the scope of the invention will be indicated in the claims.

DESCRIPTION OF EXEMPLARY EMBODIMENTS

Now, optical systems of Examples 1 through 4 according to the present invention will be described below.

Figure 1:
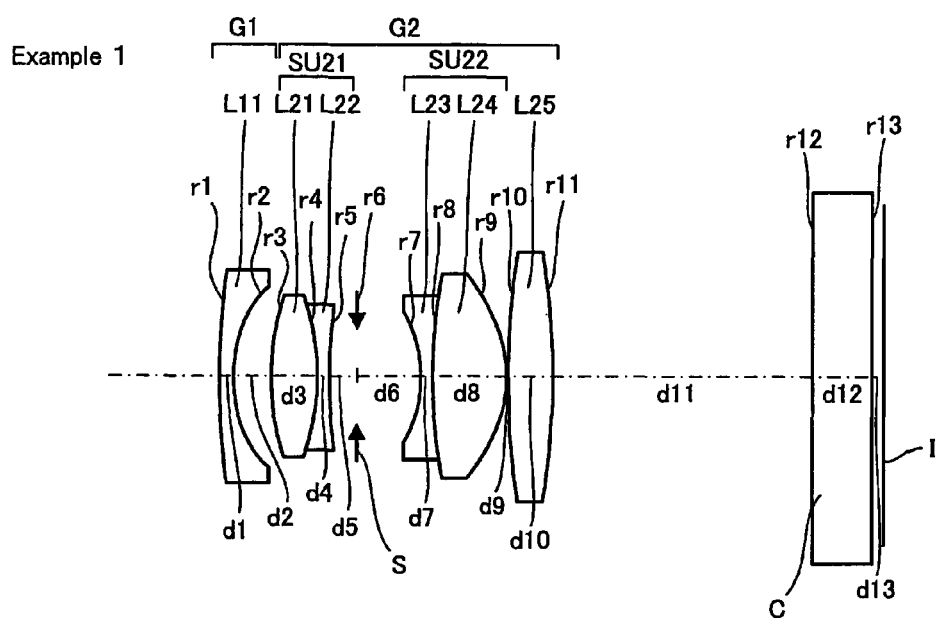
FIG. 1 is a schematic cross-sectional view of an optical system of Example 1.

FIG. 1 is a schematic cross-sectional view of the optical system of Example 1.

As shown in FIG. 1, the wide angle optical system of Example 1 includes a first lens group G1 having negative refractive power and a second lens group G2 having positive refractive power arranged from the object side in the above-mentioned order.

The first lens group G1 is formed by a negative meniscus lens L11 with its convex surfaces directed to the object side.

The second lens group G2 is formed by sequentially arranging a cemented lens SU21 of a biconvex positive lens L21 and a biconcave negative lens L22, an aperture diaphragm S, a cemented lens SU22 of a biconcave negative lens L23 and a biconvex positive lens L24 and a single biconvex positive lens L25 from the object side. In FIG. 1, C denotes a cover glass and I denotes an image plane.

Two surfaces including the opposite surfaces of the biconvex positive lens of the second lens group G2 are aspheric.

Figure 2:
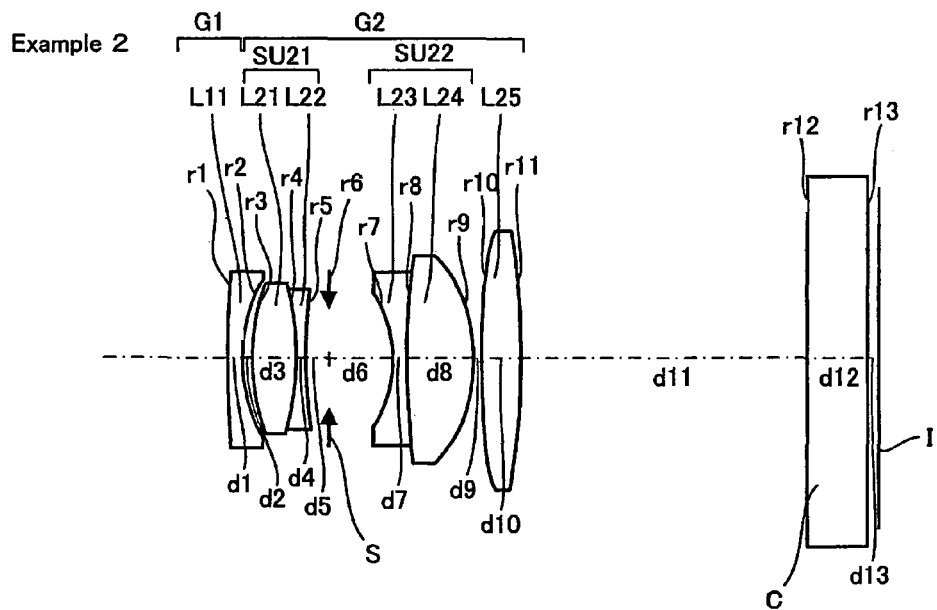
FIG. 2 is a schematic cross-sectional view of an optical system of Example 2.

FIG. 2 is a schematic cross-sectional view of the optical system of Example 2.

As shown in FIG. 2, the wide angle optical system of Example 2 includes a first lens group G1 having negative refractive power and a second lens group G2 having positive refractive power arranged from the object side in the above-mentioned order.

The first lens group G1 is formed by a negative meniscus lens L11 with its convex surfaces directed to the object side.

The second lens group G2 is formed by sequentially arranging a cemented lens SU21 of a biconvex positive lens L21 and a biconcave negative lens L22, an aperture diaphragm S, a cemented lens SU22 of a biconcave negative lens L23 and a biconvex positive lens L24 and a single biconvex positive lens L25 from the object side.

Two surfaces including the opposite surfaces of the biconvex positive lens of the second lens group G2 are aspheric.

Figure 3:
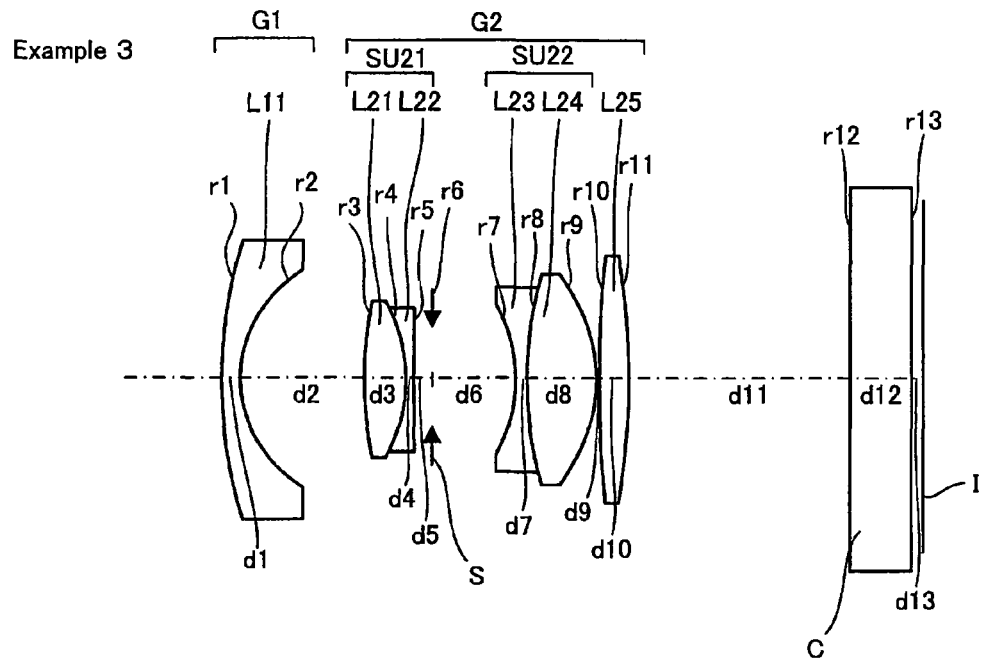
FIG. 3 is a schematic cross-sectional view of an optical system of Example 3.

FIG. 3 is a schematic cross-sectional view of the optical system of Example 3.

As shown in FIG. 3, the wide angle optical system of Example 3 includes a first lens group G1 having negative refractive power and a second lens group G2 having negative refractive power arranged from the object side in the above-mentioned order.

The first lens group G1 is formed by a negative meniscus lens L11 with its convex surfaces directed to the object side.

The second lens group G2 is formed by sequentially arranging a cemented lens SU21 of a biconvex positive lens L21 and a biconcave negative lens L22, an aperture diaphragm S, a cemented lens SU22 of a biconcave negative lens L23 and a biconvex positive lens L24 and a single biconvex positive lens L25 from the object side.

Two surfaces including the opposite surfaces of the biconvex positive lens of the second lens group G2 are aspheric.

Figure 4:
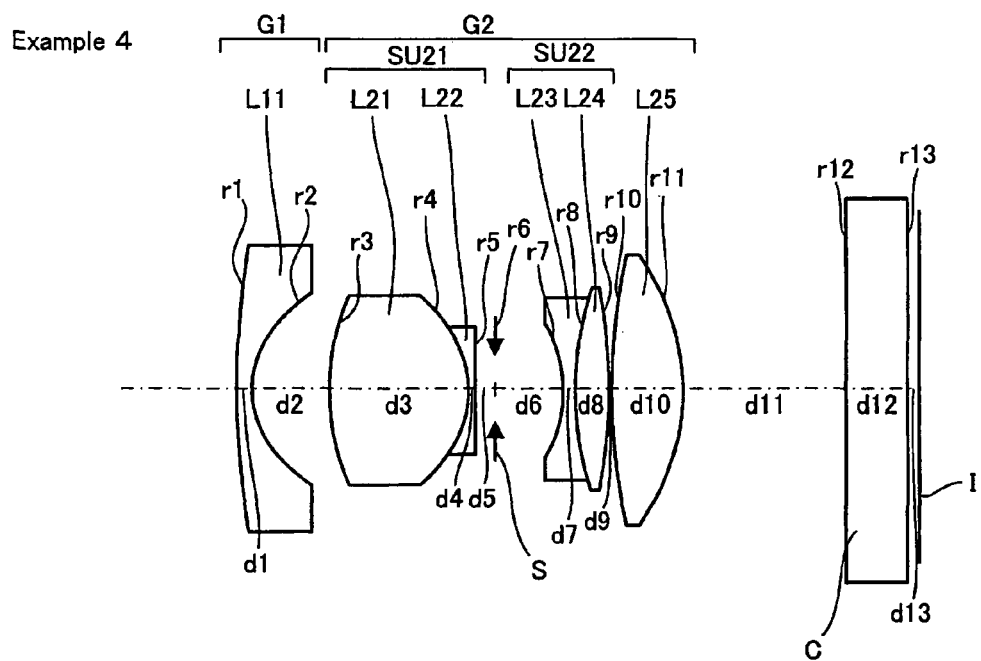
FIG. 4 is a schematic cross-sectional view of an optical system of Example 4.
Figure 5:
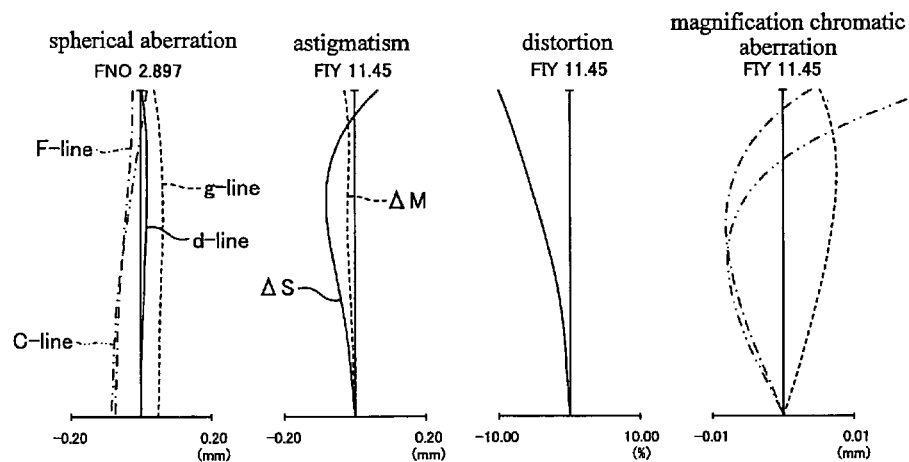
FIG. 5 is a schematic illustration of various aberrations of the optical system of Example 1 in a state of being focused at infinity.
Figure 6:
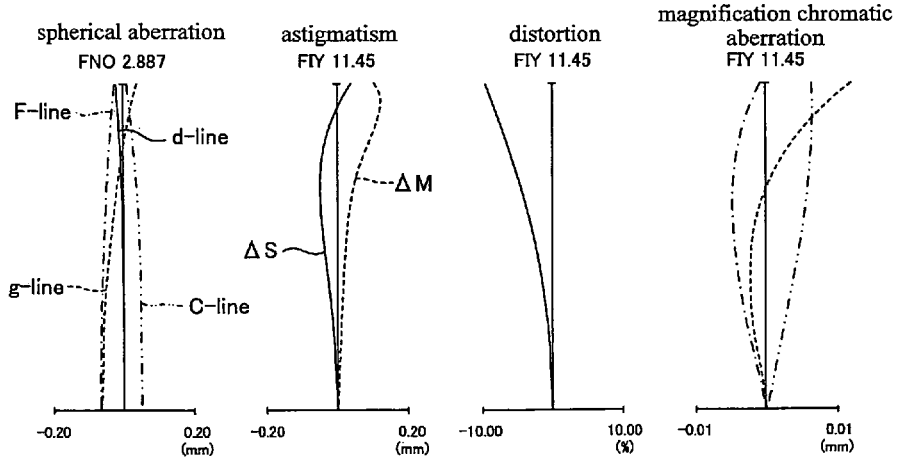
FIG. 6 is a schematic illustration of various aberrations of the optical system of Example 2 in a state of being focused at infinity.
Figure 7:
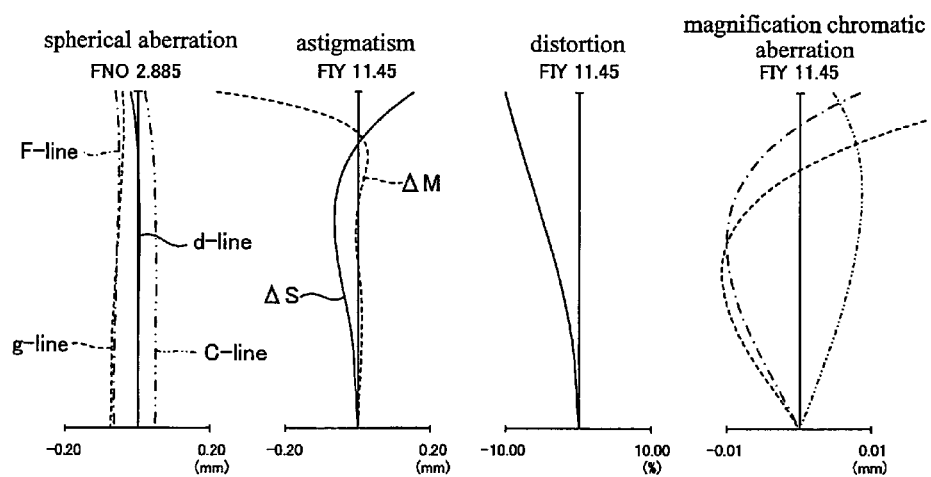
FIG. 7 is a schematic illustration of various aberrations of the optical system of Example 3 in a state of being focused at infinity.
Figure 8:
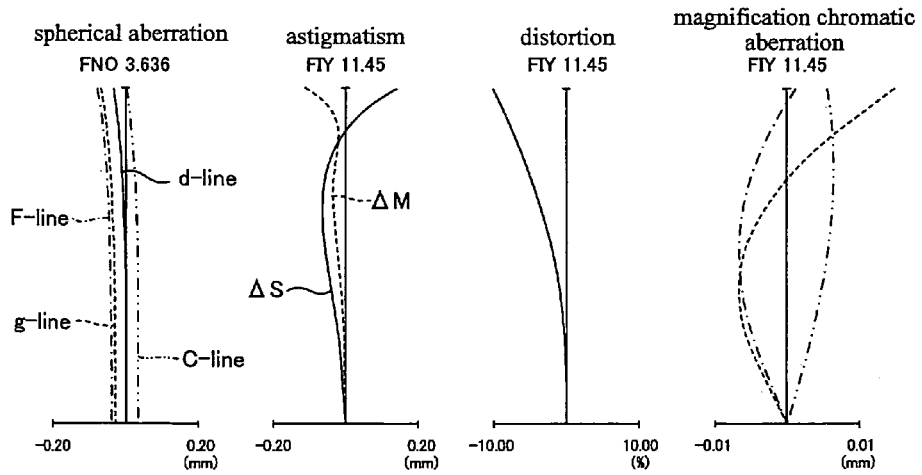
FIG. 8 is a schematic illustration of various aberrations of the optical system of Example 4 in a state of being focused at infinity.

FIG. 4 is a schematic cross-sectional view of the optical system of Example 4.

As shown in FIG. 4, the wide angle optical system of Example 4 includes a first lens group G1 having negative refractive power and a second lens group G2 having negative refractive power arranged from the object side in the above-mentioned order.

The first lens group G1 is formed by a negative meniscus lens L11 with its convex surfaces directed to the object side.

The second lens group G2 is formed by sequentially arranging a cemented lens SU21 of a biconvex positive lens L21 and a biconcave negative lens L22, an aperture diaphragm S, a cemented lens SU22 of a biconcave negative lens L23 and a biconvex positive lens L24 and a single biconvex positive lens L25 from the object side.

Three surfaces including the image side surface of the negative meniscus lens of the first lens group G1 and the opposite surfaces of the biconvex positive lens of the second lens group G2 are aspheric.

Numerical values of Examples 1 through 4 are shown below. In the list of numerical values of Examples 1 through 4 shown below, r denotes the radius of curvature of lens surface, d denotes the lens thickness and the air gap, Nd and vd respectively denotes the refractive index and the Abbe number on the d line ($\lambda$=587.6 nm), f denotes the focal length, Fno denotes the F number and $\omega$ denotes the half view angle) (°).

In the tables on Examples shown below, the surface indicated by (aspheric) is an aspheric surface. The profile of an aspheric surface is defined by formula (9) shown below:

$$X(H)=(H^2/r)/\{1+[1-(1+K)\cdot(H^2/r^2)]^{1/2}\}+A4H^4+A6H^6+A8H^8+A10H^{10} \quad (9),$$

where H is the height perpendicular to the optical axis, X(H) is the quantity of displacement in the direction of the optical axis at height H when the top of surface is selected as an origin, r is the radius of paraxial curvature, K is the conic coefficient and A2, A4, A6, A8 and A10 are respectively the aspheric coefficients of the second order, the fourth order, the sixth order, the eighth order and the tenth order.

Numerical Values of Example 1 unit mm surface data

| surface No. | r | d | nd | vd |
|---|---|---|---|---|
| 1 | 58.585 | 0.932 | 1.48749 | 70.23 |
| 2 | 9.004 | 2.478 | | |
| 3 | 18.088 | 3.046 | 1.83400 | 37.16 |
| 4 | −18.088 | 0.804 | 1.57501 | 41.5 |
| 5 | 47.964 | 1.841 | | |
| 6 (diaphragm) | ∞ | 4.212 | | |
| 7 | −10.211 | 0.752 | 1.75211 | 25.05 |
| 8 | 35.401 | 4.899 | 1.72916 | 54.68 |
| 9 | −10.810 | 0.150 | | |
| 10 (aspheric) | 44.588 | 3.000 | 1.80610 | 40.88 |
| 11 (aspheric) | −51.256 | 17.229 | | |
| 12 | ∞ | 4.082 | 1.51633 | 64.14 |
| 13 | ∞ | 0.745 | | |
| image plane | ∞ | | | |

Aspheric data

10th surface

K = −13.0866, A4 = −4.046E−06, A6 = 9.8902E−08, A8 = 1.4424E−11

11th surface

K = −8.3127, A4 = −6.2139E−06, A6 = 8.9444E−08, A8 = 5.679E−10

Various data

| f | 17.30 |
|---|---|
| Fno | 2.9 |
| $\omega$ | 36.4° |

Numerical Values of Example 2 unit mm surface data

| surface No. | r | d | nd | vd |
|---|---|---|---|---|
| 1 | 525.076 | 0.821 | 1.48749 | 70.23 |
| 2 | 10.552 | 0.736 | | |
| 3 | 14.675 | 2.914 | 1.83400 | 37.16 |
| 4 | −21.039 | 0.675 | 1.60342 | 38.03 |
| 5 | 42.990 | 1.550 | | |
| 6 (diaphragm) | ∞ | 4.299 | | |
| 7 | −8.961 | 0.986 | 1.75211 | 25.05 |
| 8 | 58.864 | 4.569 | 1.72916 | 54.68 |
| 9 | −10.914 | 0.350 | | |
| 10 (aspheric) | 46.796 | 2.709 | 1.80610 | 40.88 |
| 11 (aspheric) | −43.958 | 19.237 | | |
| 12 | ∞ | 4.082 | 1.51633 | 64.14 |
| 13 | ∞ | 0.745 | | |
| image plane | ∞ | | | |

Aspheric data

10th surface

K = −7.9145, A4 = 6.2247E−06, A6 = 1.9482E−07, A8 = 2.0449E−09

11th surface

K = −5.5456, A4 = 3.5673E−06, A6 = 1.2038E−07, A8 = 3.2051E−09

Various data

| f | 20.38 |
|---|---|
| Fno | 2.9 |
| $\omega$ | 31.9° |

Numerical Values of Example 3 unit mm surface data

| surface No. | r | d | nd | vd |
|---|---|---|---|---|
| 1 | 35.125 | 1.163 | 1.48749 | 70.23 |
| 2 | 8.645 | 8.712 | | |
| 3 | 28.299 | 2.849 | 1.83400 | 37.16 |
| 4 | −12.755 | 0.646 | 1.60342 | 38.03 |
| 5 | 3198.434 | 1.280 | | |
| 6 (diaphragm) | ∞ | 5.653 | | |
| 7 | −11.281 | 0.814 | 1.75211 | 25.05 |
| 8 | 28.071 | 4.847 | 1.72916 | 54.68 |
| 9 | −12.025 | 0.150 | | |
| 10 (aspheric) | 53.589 | 2.201 | 1.85135 | 40.10 |
| 11 (aspheric) | −50.041 | 15.424 | | |
| 12 | ∞ | 4.082 | 1.51633 | 64.14 |
| 13 | ∞ | 0.745 | | |
| image plane | ∞ | | | |

Aspheric data

10th surface

K = −17.8060, A4 = −2.4032E−05, A6 = −5.2713E−07, A8 = 7.6589E−09

11th surface

K = −5.5958, A4 = −9.0088E−06, A6 = −5.2842E−07, A8 = 7.8952E−09

-continued unit mm

Various data

| | |
|---|---|
| f | 14.28 |
| Fno | 2.9 |
| ω | 41.7° |

Numerical Values of Example 4 unit mm surface data

| surface No. | r | d | nd | vd |
|---|---|---|---|---|
| 1 | 68.591 | 0.899 | 1.48749 | 70.23 |
| 2 (aspheric) | 6.519 | 4.991 | | |
| 3 | 15.485 | 9.013 | 1.83481 | 42.71 |
| 4 | −7.608 | 0.499 | 1.62588 | 35.70 |
| 5 | −187.959 | 1.238 | | |
| 6 (diaphragm) | ∞ | 4.429 | | |
| 7 | −8.539 | 0.754 | 1.75211 | 25.05 |
| 8 | 20.227 | 2.288 | 1.72916 | 54.68 |
| 9 | −35.708 | 0.150 | | |
| 10 (aspheric) | 34.528 | 4.653 | 1.85135 | 40.10 |
| 11 (aspheric) | −12.199 | 10.441 | | |
| 12 | ∞ | 4.082 | 1.51633 | 64.14 |
| 13 | ∞ | 0.745 | | |
| image plane | ∞ | | | |

Aspheric data

2nd surface

K = −0.1296, A4 = −1.0744E−04, A6 = 1.5059E−06,
A8 = −3.9603E−08

10th surface

K = −30.8806, A4 = 6.2454E−07, A6 = 2.9500E−07,
A8 = −5.0911E−10

11th surface

K = −3.9740, A4 = −1.5444E−04, A6 = 1.4347E−06,
A8 = −1.9333E−09

Various data

| | |
|---|---|
| f | 12.33 |
| Fno | 3.6 |
| ω | 45.9° |

FIGS. 5 through 8 are illustrations of various aberrations of the optical systems of Examples 1 through 4 in a state of being focused at infinity. More specifically, the numerical values of spherical aberration and those of magnification chromatic aberration are those observed at wavelengths of 587.6 nm (d line: solid line), 435.8 nm (g line: dotted line), 486.1 nm (F line: single-dotted chain line) and 656.3 nm (C line: double-dotted chain line). As for astigmatism, the solid line refers to the sagittal image plane and the dotted line refers to the meridional image plane. FNO denotes the F number and FIY denotes the image height.

Now, the requirement values of the conditional formulas (1) through (8) of Examples are listed below.

| Conditional formula | Example 1 | Example 2 | Example 3 | Example 4 |
|---|---|---|---|---|
| (1) | 0.324 | 0.473 | 0.375 | 0.453 |
| (2) | 0.070 | −0.031 | −0.034 | −0.478 |
| (3) | 0.452 | 0.343 | 0.992 | 1.084 |
| (4) | 35.069 | 10.174 | 31.321 | 1.629 |
| (5) | 0.936 | 0.813 | 1.174 | 1.309 |
| (6) | 1.356 | 1.333 | 1.424 | 0.920 |
| (7) | 0.855 | 0.611 | 1.465 | 1.681 |
| (8) | 0.268 | 0.256 | 0.252 | 0.298 |

Figure 9:
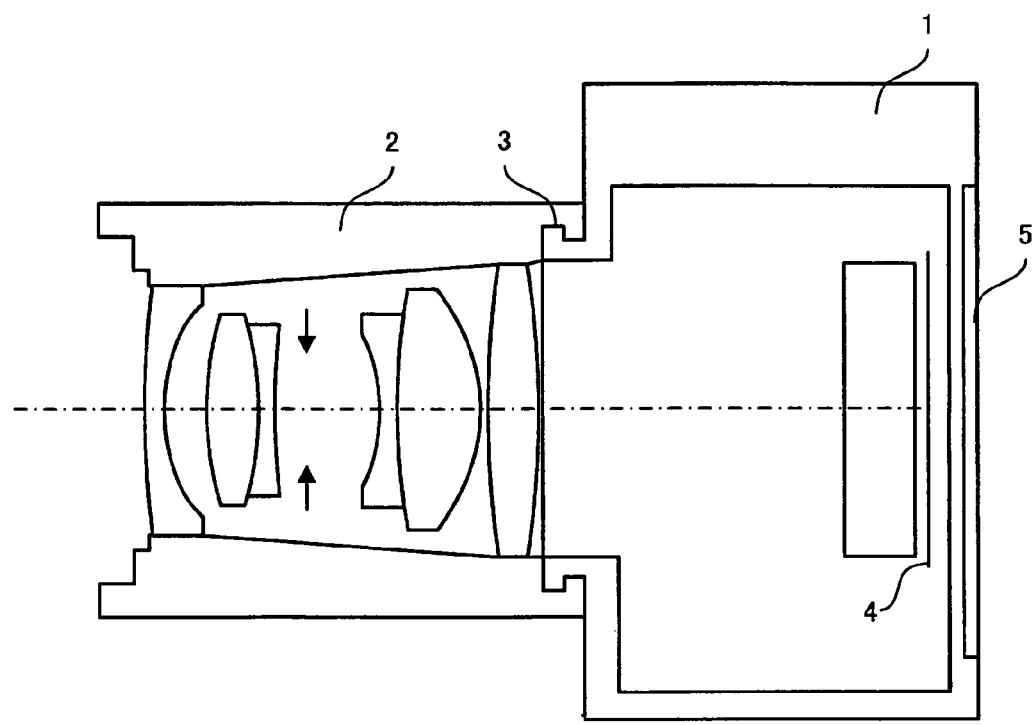
FIG. 9 is a schematic cross-sectional view of camera with interchangeable lenses including a wide angle lens according to the present invention as an interchangeable lens.

FIG. 9 is a schematic cross-sectional view of a single lens reflex camera using a wide angle lens according to the present invention, which is an electronic image pickup apparatus including a small CCD or CMOS as an image pickup element. In FIG. 9, 1 denotes the single lens reflex camera, 2 denotes the imaging lens system arranged in a barrel, 3 denotes the mount section of the barrel at which the imaging lens system 2 can be removably mounted in the single lens reflex camera 1 and which may typically be a screw type mount or a bayonet type mount. Here, the bayonet type mount is used. In FIG. 9, 4 denotes the image pickup element plane, 5 denotes the back monitor, 6 denotes the finder image display element and 7 denotes the finder optical system.

A wide angle lens such as any of the wide angle lenses of Examples 1 through 4 described above may be used for the imaging lens system 2 of a single lens reflex camera 1 having the above-described configuration.

Thus, according to the present invention, it is possible to provide a compact wide angle optical system that has a small number of component lenses and can correct various aberrations, such as chromatic aberration and field curvature in particular, while performing correction of distortions to a certain extent and secure telecentricity at the same time.

Figure 10:
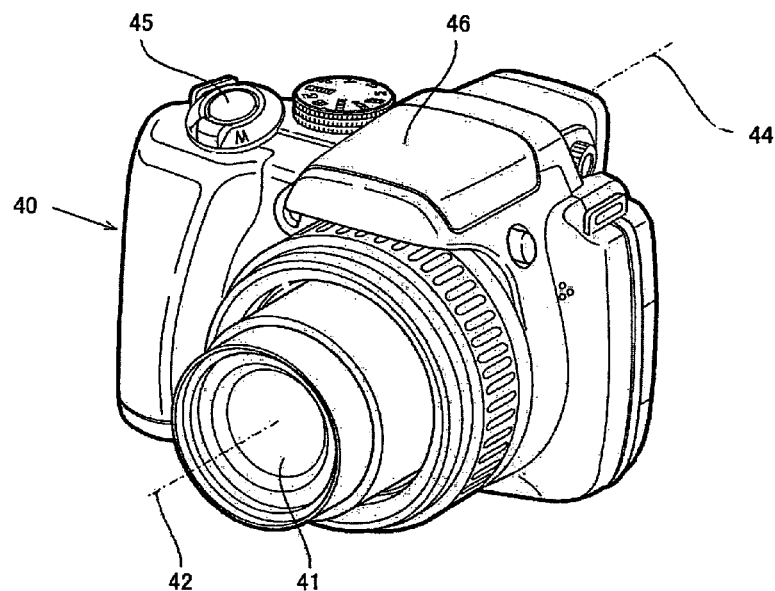
FIG. 10 is a schematic perspective front view of a digital camera according to the present invention, showing an appearance thereof.
Figure 11:
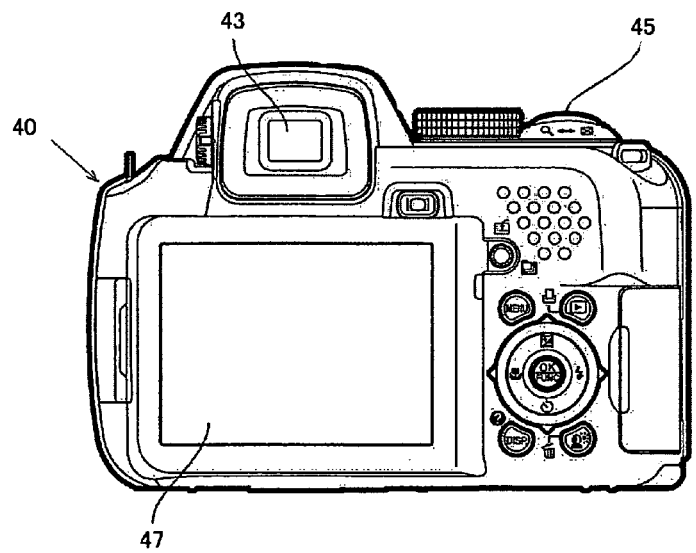
FIG. 11 is a schematic back view of the digital camera of FIG. 10.
Figure 12:
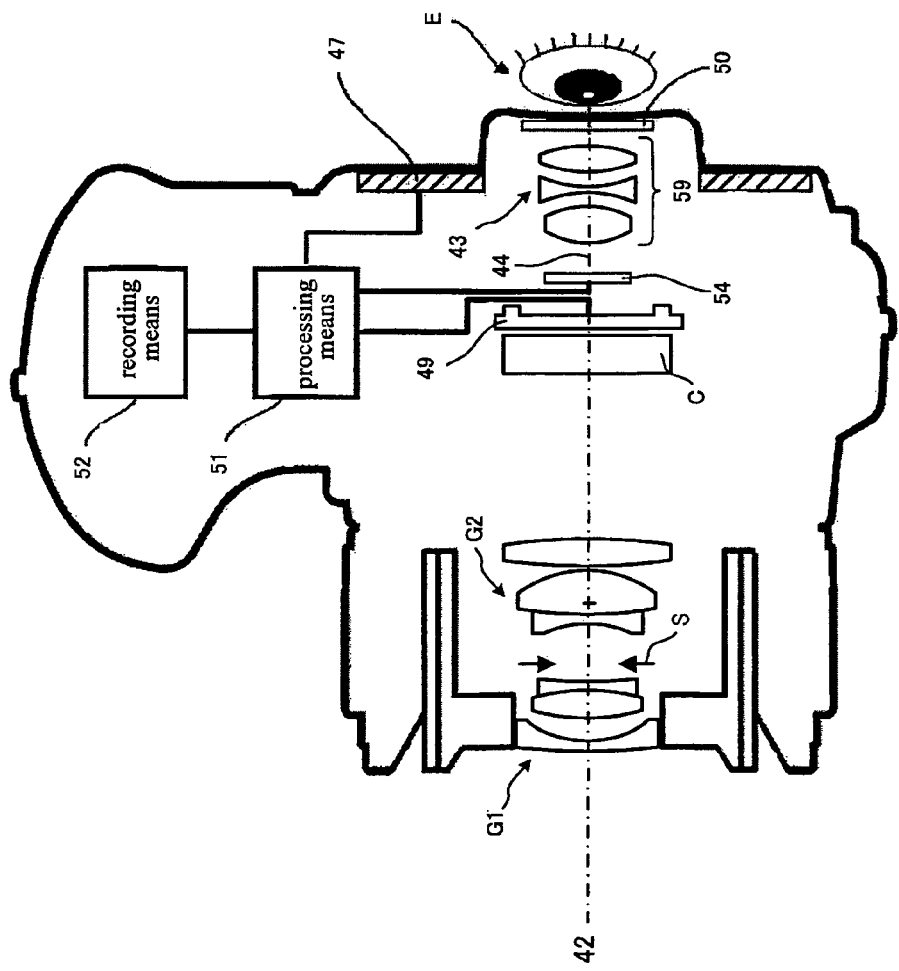
FIG. 12 is a schematic transversal cross-sectional view of the digital camera of FIG. 10.

FIGS. 10 through 13 are conceptual illustrations of the configuration of an image pickup apparatus, which is a digital camera, having a wide angle lens incorporated in an image pickup optical system 41 thereof. FIG. 10 is a schematic perspective front view of the digital camera 40 according to the present invention, showing an appearance thereof. FIG. 11 is a schematic back view of the digital camera 40 of FIG. 10. FIG. 12 is a schematic transversal cross-sectional view of the digital camera 40 of FIG. 10. In FIGS. 10 and 12, image pickup optical system 41 is ready for an image pickup operation (as the barrel is not retracted) and, in FIG. 11, the image pickup optical system 41 is not ready for an image pickup operation (as the barrel is retracted).

In the illustrated instance, the digital camera 40 includes an image pickup optical system 41 arranged on the imaging light path 42, a finder optical system 43 arranged on the finder light path 44, a shutter button 45, a popup strobe 46 and a liquid crystal display monitor 47 among others. As the shutter button 45 arranged at an upper part of the camera 40 is depressed, the image pickup optical system 41 is driven to operate in an interlocked manner so that an image is picked up through the lens of Example 1, for example. The image of an object picked up by the image pickup optical system 41 is produced on the imaging plane (photoelectric conversion plane) of the CCD 49 that is an image pickup element arranged near the focal plane by way of the cover glass C. The image of the object received by the CCD 49 is then displayed on the liquid crystal display monitor 47 and a finder image display element 54 arranged at the back side of the camera as an electronic image by way of a processing means 51. A recording means 52 is connected to the processing means 51 so that the picked up electronic image can be recorded there.

As the image pickup operation ends and the camera is brought into a state of being not ready for an image pickup operation, the entire image pickup optical system 41 stops at the side of the CCD 49 relative to the focused position of an object at infinity. A space is provided between the second lens group G2 and the third lens group G3 and also between the lens at the extremity of the image side and the CCD 49 so as to allow the entire image pickup optical system 41 to move along the optical axis toward the side of the CCD 49 beyond the focused position of an object at infinity in a state where the camera is not ready for an image pickup operation in order to secure the liming region at the side of the CCD 49 in a state where the entire lens barrel is retracted.

The recording means 52 may be arranged independently from the processing means 51 or alternatively it may be so arranged that the picked up electronic image is electronically recorded/written on a flexible disk, a memory card or an MO. The CCD 49 may be replaced by a silver salt film camera using a silver salt film.

A finder eyepiece 59 is arranged on the finder light path 44. The image of the object displayed on the finder image display element 54 is enlarged and adjusted for the viewer's eyesight by the finder eyepiece 59 before it is led to an eyeball E of a viewer. A cover member 50 is arranged at the exit side of the finder eyepiece 59.

Figure 13:
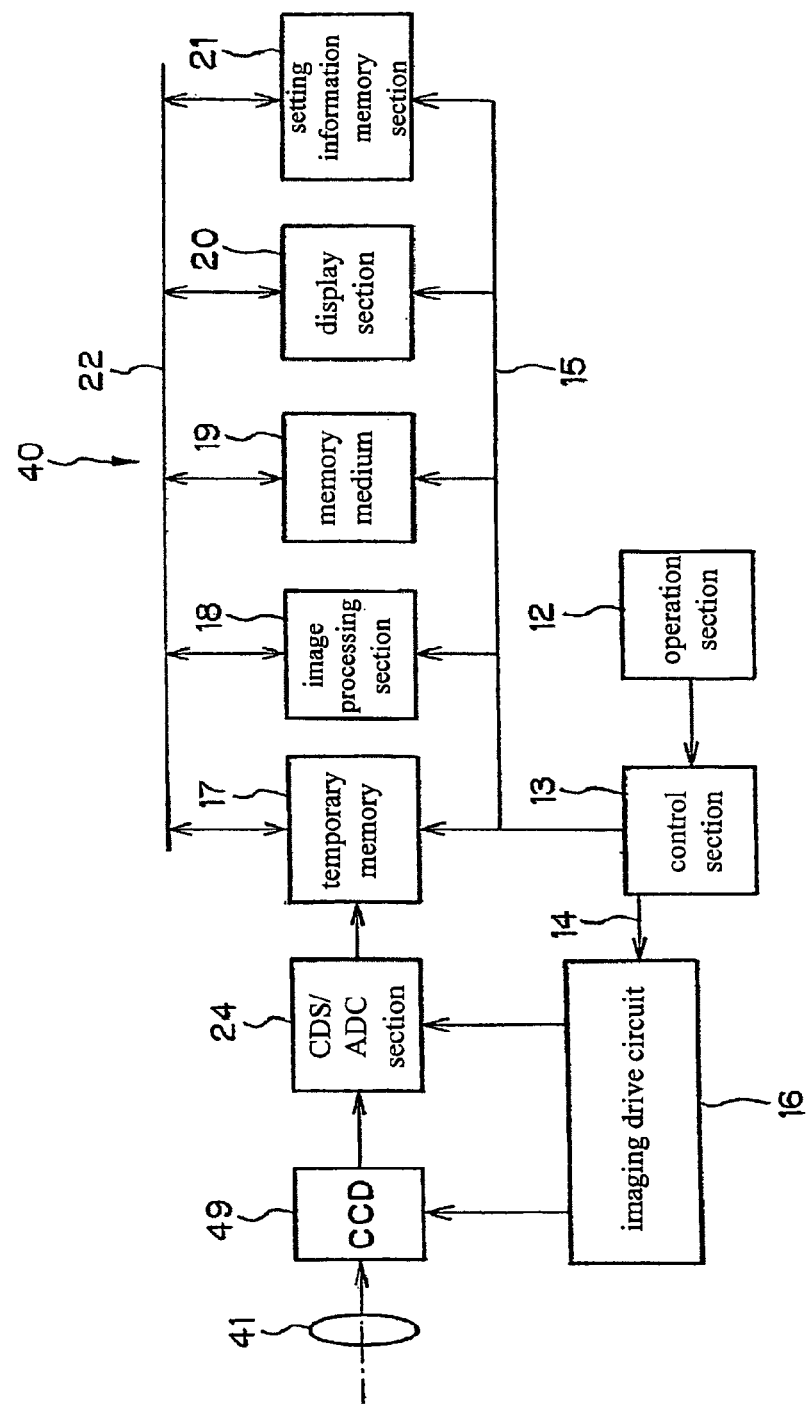
FIG. 13 is a schematic block diagram of a principal part of the digital camera of FIG. 10, showing the internal circuit configuration thereof.

FIG. 13 is a schematic block diagram of the internal circuit of a principal part of the above-described digital camera 40, showing the configuration thereof. The above-described processing means 51 typically includes a CDS/ADC section 24, a temporary memory 17 and an image processing section 18 and the memory means 52 typically includes a memory medium section 19.

As shown in FIG. 13, the digital camera 40 has an operation section 12, a control section 13 connected to the operation section 12, an imaging drive circuit 16, a temporary memory 17, the imaging drive circuit 16 and the temporary memory 17 being connected to a control signal output port of the control section 13 respectively by way of buses 14 and 15, an image processing section 18, a memory medium section 19, a display section 20 and a setting information memory section 21.

The above-listed temporary memory 17, the image processing section 18, the memory medium section 19, the display section 20 and the setting information memory section 21 are so arranged as to be able to input data from and output data to each other by way of a bus 22. The imaging drive circuit 16 is connected to the CCD 49 and the CDS/ADC section 24.

The operation section 12 has various input buttons and switches. It is a circuit for notifying the event information that is externally input by way of any of the input buttons and the switches to the control section. The control section 13 is a central processing unit (CPU) that contains a program memory (not shown) and controls the entire digital camera 40 according to the programs stored in the program memory in response to an instruction input by a camera user by way of the operation section 12.

The CCD 49 receives the image of an object formed by way of the image pickup optical system 41 as light. The CCD 49 is driven to operate by the imaging drive circuit 16. It is an image pickup element that converts the quantity of light of each pixel of the image of the object into electric signals and outputs them to the CDS/ADC section 24.

The CDS/ADC section 24 is a circuit that amplifies the electric signals input from the CCD 49, converts the electric signals into digital signals by analog/digital conversion and then outputs the video raw data (bayer data, to be referred to as raw data hereinafter) obtained simply by amplification and analog/digital conversion.

The temporary memory 17 is a buffer typically formed by an SDRAM. It is a memory device that temporarily stores the raw data output from the CDS/ADC section 24. The image processing section 18 is a circuit that reads out the raw data stored in the temporary memory 17 or the raw data stored in the memory medium section 19 and electrically executes various image processing operations including those of correcting distortion according to the image quality parameter specified by the control section 13.

The memory medium section 19 is a control circuit of a device that is to be removably mounted by a recording medium which may be a card type or stick type memory medium such as a flash memory to store and hold the raw data transferred from the temporary memory 17 and the image data subjected to an image processing operation in the image processing section 18.

The display section 20 is a circuit that includes a liquid crystal display monitor 47 and a finder image display element 54 so as to display an image or an operation menu on the liquid crystal display monitor 47 and the finder image display element 54. The setting information memory section 21 includes a ROM section that stores various image quality parameters in advance and a RAM section that stores the image quality parameter selected from the image parameters read out from the ROM section by an input operation at the operation section 12. The setting information memory section 21 is a circuit that controls the inputs to and the outputs from those memories.

In the digital camera 40 having the above-described configuration, by the present invention, it is possible to provide an image pickup apparatus using a compact wide angle optical system that has a small number of component lenses and can correct various aberrations, such as chromatic aberration and field curvature in particular, while performing correction of distortions to a certain extent and secure telecentricity at the same time.

The present invention is applicable not only to so-called general-purpose compact digital cameras but also to monitor cameras and the like that need a wide angle of view.

What is claimed is:

1. A wide angle optical system comprising:
    a first lens group of negative refractive power; and
    a second lens group of positive refractive power;
    the first lens group and the second lens group being arranged in the above-mentioned order from the object side;
    the second lens group including:
        a cemented doublet SU21;
        an aperture diaphragm;
        a lens SU22; and
        a positive refractive power biconvex lens L25;
        the cemented doublet, the aperture diaphragm, the lens and the positive refractive power biconvex lens being arranged immediately following one another in the above-mentioned order from the object side;
        the largest air space on the axis being a combination of the front and rear air spaces of the aperture diaphragm except for air spaces after the final lens to the focal plane;
        the wide angle optical system being divided into the first lens group and the second lens group at the second largest air space operating as a boundary, the air space not including an air space adjacent to the diaphragm
        the wide angle optical system being divided into the first lens group and the second lens group at the second largest air space operating as a boundary, the air space not including an air space adjacent to the diaphragm.

2. A wide angle optical system comprising:
a first lens group of negative refractive power; and
a second lens group of positive refractive power;
the first lens group and the second lens group being arranged in the above-mentioned order from the object side;
the second lens group including:
a cemented doublet SU21 consisting of a lens L21 having a cemented convex surface and a lens L22 having a cemented concave surface;
an aperture diaphragm;
a cemented doublet SU22 consisting of a lens L23 having a cemented concave surface and a lens L24 having a cemented convex surface; and
a positive refractive power biconvex lens L25;
the cemented doublet, the aperture diaphragm, the cemented doublet and the biconvex lens being arranged immediately following one another in the above-mentioned order from the object side;
the largest air space on the axis being a combination of the front and rear air spaces of the aperture diaphragm except for air spaces after the final lens to the focal plane.

3. The wide angle optical system according to claim 1, wherein the first lens group is formed by a meniscus lens L11 having negative refractive power with a convex surface directed to the object side; and the second lens group is formed by sequentially arranging: a cemented doublet SU21 consisting of a lens L21 having a cemented convex surface and a lens L22 having a cemented concave surface; an aperture diaphragm; a cemented doublet SU22 consisting of a lens L23 having a cemented concave surface and a lens L24 having a cemented convex surface; a biconvex lens L25; in the above-mentioned order from the object side.

4. The wide angle optical system according to claim 2, wherein the first lens group is formed by a meniscus lens L11 having negative refractive power with a convex surface directed to the object side; and the second lens group is formed by sequentially arranging: a cemented doublet SU21 consisting of a lens L21 having a cemented convex surface and a lens L22 having a cemented concave surface; an aperture diaphragm; a cemented doublet SU22 consisting of a lens L23 having a cemented concave surface and a lens L24 having a cemented convex surface; a biconvex lens L25; in the above-mentioned order from the object side.

5. The wide angle optical system according to claim 3, wherein the cemented doublet SU22 consists of: a biconcave lens L23; and a biconvex lens L24; the cemented doublet S22 having positive refractive power.

6. The wide angle optical system according to claim 4, wherein the cemented doublet SU22 consists of: a biconcave lens L23; and a biconvex lens L24; the cemented doublet S22 having positive refractive power.

7. The wide angle optical system according to claim 1, wherein the surface of the biconvex lens L25 arranged at the extremity of the image side is an aspheric surface whose positive refractive power decreases as a function of the distance from the optical axis.

8. The wide angle optical system according to claim 2, wherein the surface of the biconvex lens L25 arranged at the extremity of the image side is an aspheric surface whose positive refractive power decreases as a function of the distance from the optical axis.

9. The wide angle optical system according to claim 1, wherein the lens SU22 is a cemented doublet lens, and satisfying requirements of conditional formula (1) shown below:

$$0.3 \leq (R45+R23)/(R45-R23) \leq 0.5 \quad (1),$$

where R23 is a radius of curvature of the cemented surface of the cemented lens SU21 arranged at the object side of the aperture diaphragm; and R45 is a radius of curvature of the cemented surface of the cemented lens SU22 arranged at the image side of the aperture diaphragm.

10. The wide angle optical system according to claim 2, wherein the lens SU22 is a cemented doublet lens, and satisfying requirements of conditional formula (1) shown below:

$$0.3 \leq (R45+R23)/(R45-R23) 0.5 \quad (1),$$

where R23 is a radius of curvature of the cemented surface of the cemented lens SU21 arranged at the object side of the aperture diaphragm; and R45 is a radius of curvature of the cemented surface of the cemented lens SU22 arranged at the image side of the aperture diaphragm.

11. The wide angle optical system according to claim 1, satisfying requirements of conditional formula (2) shown below:

$$-0.5 \leq (R6r-R6f)/(R6r-R6f) \leq 0.3 \quad (2),$$

where R6f is a radius of curvature of the object side lens surface of the biconvex lens; and R6r is a radius of curvature of the image side lens surface of the biconvex lens.

12. The wide angle optical system according to claim 2, satisfying requirements of conditional formula (2) shown below:

$$-0.5 \leq (R6r+R6f)/(R6r-R6f) \leq 0.3 \quad (2),$$

where R6f is a radius of curvature of the object side lens surface of the biconvex lens; and R6r is a radius of curvature of the image side lens surface of the biconvex lens.

13. The wide angle optical system according to claim 1, wherein the lens SU22 is a cemented doublet lens, and satisfying requirements of conditional formula (3) shown below:

$$0.3 \leq (R3r+R3f)/(R3r-R3f) \leq 0.5 \quad (3),$$

where R3f is a radius of curvature of the object side lens surface of the lens having a cemented concave surface of the cemented lens arranged at the object side of the aperture diaphragm; and R3r is a radius of curvature of the image side lens surface of the lens having a cemented concave surface of the cemented lens arranged at the object side of the aperture diaphragm.

14. The wide angle optical system according to claim 2, wherein the lens SU22 is a cemented doublet lens, and satisfying requirements of conditional formula (3) shown below:

$$0.3 \leq (R3r+R3f)/(R3r-R3f) \leq 0.5 \quad (3),$$

where R3f is a radius of curvature of the object side lens surface of the lens having a cemented concave surface of the cemented lens arranged at the object side of the aperture diaphragm; and R3r is a radius of curvature of the image side lens surface of the lens having a cemented concave surface of the cemented lens arranged at the object side of the aperture diaphragm.

15. The wide angle optical system according to claim 1, wherein the lens SU22 is a cemented doublet lens, and satisfying requirements of conditional formula (4) shown below:

$$10 \leq (R45r+R45f)/(R45r-R45f) \leq 40 \quad (4),$$

where R45f is a radius of curvature of the object side lens surface of the cemented lens arranged at the image side of the aperture diaphragm; and R45r is a radius of curvature of the image side lens surface of the cemented lens arranged at the image side of the aperture diaphragm.

16. The wide angle optical system according to claim 2, wherein the lens SU22 is a cemented doublet lens, and satisfying requirements of conditional formula (4) shown below:

$$10 \leq (R45r+R45f)/(R45r-R45f) \leq 40 \quad (4),$$

where R45f is a radius of curvature of the object side lens surface of the cemented lens arranged at the image side of the aperture diaphragm; and R45r is a radius of curvature of the image side lens surface of the cemented lens arranged at the image side of the aperture diaphragm.

17. The wide angle optical system according to claim 1, satisfying requirements of conditional formulas (4) and (5) shown below:

$$0.8 \leq f2/f \leq 1.2 \quad (5) \text{ and}$$

$$1.3 \leq |f1/f2| \leq 1.5 \quad (6),$$

where f1 is the focal length of the first lens group of the optical system; f2 is the focal length of the second lens group of the optical system; and f is the focal length of the overall optical system.

18. The wide angle optical system according to claim 2, satisfying requirements of conditional formulas (5) and (6) shown below:

$$0.8 \leq f2/f \leq 1.2 \quad (5) \text{ and}$$

$$1.3 \leq |f1/f2| \leq 1.5 \quad (6),$$

where f1 is the focal length of the first lens group of the optical system; f2 is the focal length of the second lens group of the optical system; and f is the focal length of the overall optical system.

19. The wide angle optical system according to claim 1, satisfying requirements of conditional formulas (5)' and (7) shown below:

$$1.0 \leq f2/f \leq 1.4 \quad (5)' \text{ and}$$

$$1.3 \leq |HD12/f| \leq 1.8 \quad (7),$$

where f2 is the focal length of the second lens group of the optical system; f is the focal length of the overall optical system; and HD12 is a gap between the image side principal plane of the first lens group and the object side principal plane of the second lens group of the optical system.

20. The wide angle optical system according to claim 2, satisfying requirements of conditional formulas (5)' and (7) shown below:

$$1.0 \leq f2/f \leq 1.4 \quad (5)' \text{ and}$$

$$1.3 \leq |HD12/f| \leq 1.8 \quad (7),$$

where f2 is the focal length of the second lens group of the optical system; f is the focal length of the overall optical system; and HD12 is a gap between the image side principal plane of the first lens group and the object side principal plane of the second lens group of the optical system.

21. The wide angle optical system according to claim 1, satisfying requirements of conditional formula (8) shown below:

$$|IH/EXP| \leq 0.35 \quad (8),$$

where IH is the largest image height; and EXP is the distance on the optical axis from the image plane to the exit pupil (the direction from the object side toward the image side being the positive direction).

22. The wide angle optical system according to claim 2, satisfying requirements of conditional formula (8) shown below:

$$|IH/EXP| \leq 0.35 \quad (8),$$

where IH is the largest image height; and EXP is the distance on the optical axis from the image plane to the exit pupil (the direction from the object side toward the image side being the positive direction).

23. An image pickup apparatus comprising: a wide angle optical system according to claim 1; drive means for driving the entire optical system to move in the direction of the optical axis; and an image pickup element arranged near the focusing surface of the optical system, wherein the overall optical system being able to be driven to move toward the image pickup element side along the optical axis beyond the focused position of an object at infinity and held stationary at the image pickup element side relative to the focused position of an object at infinity in a state of not operating to pick up an image.

24. An image pickup apparatus comprising: a wide angle optical system according to claim 2; drive means for driving the entire optical system to move in the direction of the optical axis; and an image pickup element arranged near the focusing surface of the optical system; the overall optical system being able to be driven to move toward the image pickup element side along the optical axis beyond the focused position of an object at infinity and held stationary at the image pickup element side relative to the focused position of an object at infinity in a state of not operating to pick up an image.

25. The image pickup apparatus according to claim 23, wherein the entire optical system is allowed to move toward the image pickup element side along the optical axis beyond the focused position of an object at infinity in a state of not operating to pick up an image by providing a space in advance between the lens at the extremity of the image side of the optical system and the image pickup element so that a limiting region is secured at the image pickup element side in a state where the entire lens barrel is retracted.

26. The image pickup apparatus according to claim 24, wherein the entire optical system is allowed to move toward the image pickup element side along the optical axis beyond the focused position of an object at infinity in a state of not operating to pick up an image by providing a space in advance between the lens at the extremity of the image side of the optical system and the image pickup element so that a limiting region is secured at the image pickup element side in a state where the entire lens barrel is retracted.

* * * * *